United States Patent
Farmer (10) Patent No.: US 10,427,352 B2
(45) Date of Patent: Oct. 1, 2019

(54) EXTRUSION-BASED ADDITIVE MANUFACTURING SYSTEM AND METHOD

(71) Applicant: AIRBUS GROUP LIMITED, London (GB)

(72) Inventor: Benjamin Farmer, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 487 days.

(21) Appl. No.: 14/910,646

(22) PCT Filed: Jul. 24, 2014

(86) PCT No.: PCT/GB2014/052256
§ 371 (c)(1),
(2) Date: Feb. 5, 2016

(87) PCT Pub. No.: WO2015/019053
PCT Pub. Date: Feb. 12, 2015

(65) Prior Publication Data
US 2016/0176109 A1    Jun. 23, 2016

(30) Foreign Application Priority Data
Aug. 6, 2013    (GB) .................................. 1314030.6

(51) Int. Cl.
*B29C 67/00*    (2017.01)
*B29C 64/106*    (2017.01)
(Continued)

(52) U.S. Cl.
CPC ............ *B29C 64/106* (2017.08); *B29C 64/20* (2017.08); *B29C 64/386* (2017.08);
(Continued)

(58) Field of Classification Search
CPC ... B29C 67/0055; B29C 64/386; B29C 64/20; B29C 64/106
See application file for complete search history.

(56) References Cited

U.S. PATENT DOCUMENTS 4,247,508 A * 1/1981 Housholder ....... G05B 19/4099
264/122
5,121,329 A * 6/1992 Crump .................... B22F 3/115
228/180.5
(Continued)

FOREIGN PATENT DOCUMENTS

DE    3904230 A1    8/1990
DE    4422146 A1    1/1996
(Continued)

OTHER PUBLICATIONS http://www.thingiverse.com/thing:75735 dated Jan. 25, 2016.
(Continued)

*Primary Examiner* — Joseph S Del Sole
*Assistant Examiner* — Emmanuel S Luk
(74) *Attorney, Agent, or Firm* — Nixon & Vanderhye P.C.

(57) ABSTRACT

A method of manufacturing an object is disclosed. Material is extruded from an extrusion head onto a tool, the extrusion head having an extrusion axis along which the material flows as it exits the extrusion head. Relative movement is generated between the extrusion head and the tool as the material is extruded so that the material is deposited as a series of layers, wherein the material cures on or after deposition so that the layers are fused together. The extrusion and the relative movement are controlled so that the series of layers are shaped in accordance with a stored three-dimensional model of the object. At least some of the layers are non-planar layers.

14 Claims, 10 Drawing Sheets

(51) Int. Cl.
  *B29C 64/20* (2017.01)
  *B29C 64/386* (2017.01)
  *B33Y 10/00* (2015.01)
  *B33Y 30/00* (2015.01)
  *B33Y 50/02* (2015.01)
  *B29K 105/08* (2006.01)
  *B29K 223/00* (2006.01)

(52) U.S. Cl.
  CPC .. *B29K 2105/08* (2013.01); *B29K 2223/0608* (2013.01); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 5,134,569 A * | 7/1992 | Masters | ............... | B29C 35/08 |
| | | | | 156/272.8 |
| 5,340,433 A * | 8/1994 | Crump | ............... | B22F 3/115 |
| | | | | 118/202 |
| 5,633,021 A * | 5/1997 | Brown | ............... | B29C 41/36 |
| | | | | 222/526 |
| 5,717,599 A * | 2/1998 | Menhennett | ....... | B29C 67/0059 |
| | | | | 156/578 |
| 5,866,058 A * | 2/1999 | Batchelder | ........... | B29C 64/106 |
| | | | | 264/237 |
| 6,324,440 B1 * | 11/2001 | Hillier | ................. | B29C 64/106 |
| | | | | 118/680 |
| 6,441,338 B1 * | 8/2002 | Rabinovich | ......... | B21D 37/205 |
| | | | | 219/121.64 |
| 7,848,838 B2 * | 12/2010 | Gershenfeld | ......... | B33Y 50/02 |
| | | | | 264/113 |
| 9,364,995 B2 * | 6/2016 | Roberts, IV | ........ | B29C 67/0088 |
| 9,789,652 B2 * | 10/2017 | Armstrong | ............ | B29C 64/386 |
| 9,962,799 B2 * | 5/2018 | Hascoet | ................. | B23P 23/04 |
| 2011/0215501 A1 * | 9/2011 | Elyasi | .................... | B29C 33/48 |
| | | | | 264/219 |
| 2013/0015596 A1 * | 1/2013 | Mozeika | ............... | B25J 9/0084 |
| | | | | 264/40.1 |
| 2013/0197683 A1 * | 8/2013 | Zhang | ................ | B22F 3/1055 |
| | | | | 700/96 |
| 2013/0209600 A1 * | 8/2013 | Tow | ................... | G01N 35/1011 |
| | | | | 425/375 |
| 2014/0232035 A1 * | 8/2014 | Bheda | ................ | B29C 67/0088 |
| | | | | 264/148 |
| 2014/0252668 A1 * | 9/2014 | Austin | .................... | B28B 3/20 |
| | | | | 264/40.7 |
| 2014/0284832 A1 * | 9/2014 | Novikov | ............ | B29C 67/0088 |
| | | | | 264/40.1 |
| 2014/0287139 A1 | 9/2014 | Farmer et al. | | |
| 2014/0328963 A1 * | 11/2014 | Mark | ................... | B29C 67/0088 |
| | | | | 425/143 |
| 2015/0021832 A1 * | 1/2015 | Yerazunis | ........... | B29C 67/0055 |
| | | | | 264/443 |
| 2015/0230912 A1 * | 8/2015 | Lee | ........................ | B33Y 80/00 |
| | | | | 623/23.72 |
| 2015/0239148 A1 * | 8/2015 | Israel | ..................... | B33Y 10/00 |
| | | | | 264/40.3 |
| 2015/0266243 A1 * | 9/2015 | Mark | ..................... | B29C 70/20 |
| | | | | 425/143 |
| 2015/0266244 A1 * | 9/2015 | Page | ..................... | B22F 3/1055 |
| | | | | 425/78 |
| 2015/0298393 A1 * | 10/2015 | Suarez | .................. | B33Y 70/00 |
| | | | | 425/3 |
| 2015/0375344 A1 * | 12/2015 | Adcock | ............... | G05B 19/402 |
| | | | | 219/76.1 |
| 2016/0001461 A1 * | 1/2016 | Gardiner | .................. | B25J 11/00 |
| | | | | 264/219 |
| 2016/0046755 A1 * | 2/2016 | Boday | ................... | C08G 12/08 |
| | | | | 264/308 |
| 2016/0096331 A1 * | 4/2016 | Linnell | ................. | B33Y 10/00 |
| | | | | 264/494 |
| 2016/0198576 A1 * | 7/2016 | Lewis | ............... | H01L 23/49822 |
| | | | | 361/761 |
| 2017/0066194 A1 * | 3/2017 | Bromer | ................. | B33Y 30/00 |
| 2017/0106594 A1 * | 4/2017 | Gardiner | ............... | B33Y 30/00 |
| 2017/0173868 A1 * | 6/2017 | Mark | .................. | B29C 45/1418 |
| 2017/0240298 A1 * | 8/2017 | Goehlich | ............... | B33Y 10/00 |

FOREIGN PATENT DOCUMENTS

| | | |
|---|---|---|
| JP | 2013146936 | 8/2013 |
| WO | 2012037329 A2 | 3/2012 |
| WO | 2013108914 A1 | 7/2013 |

OTHER PUBLICATIONS http://www.dezeen.com/2013/05/17/mataerial-3d-printer-by-petr-novikov-sasa-jokic-and-joris-laarman-studio/.
UKIPO Search Report dated Jan. 22, 2014 issued in Great Britain Application No. 1314030.6.
ISR and WO dated Oct. 23, 2014 issued in PCT/GB2014/052256.

* cited by examiner

EXTRUSION-BASED ADDITIVE MANUFACTURING SYSTEM AND METHOD

RELATED APPLICATIONS

The present application is a National Phase of International Application Number PCT/GB2014/052256, filed Jul. 24, 2014, which claims priority from Great Britain Application Number 1314030.6, filed Aug. 6, 2013.

FIELD OF THE INVENTION

The present invention relates to an extrusion-based additive manufacturing system, and a method of manufacturing an object.

BACKGROUND OF THE INVENTION

An extrusion-based additive manufacturing system is described in WO2012/037329. The system uses a filament as consumable feedstock. The filament has a core portion and a shell portion with different peak crystallization temperatures. Both the core and the shell portions are melted in an extrusion head, and after they have been deposited the portion with the higher crystallization temperature crystallizes before the other portion.

SUMMARY OF THE INVENTION

The present invention provides a method of manufacturing an object, the method comprising: extruding material from an extrusion head onto a tool, the extrusion head having an extrusion axis along which the material flows as it exits the extrusion head; generating a relative movement between the extrusion head and the tool as the material is deposited so that the material is deposited as a series of layers, wherein the material cures on or after deposition so that the layers are fused together, and controlling the extrusion of the material and the relative movement so that the series of layers are shaped in accordance with a stored three-dimensional model of the object. At least some of the layers are non-planar layers, and the relative movement during the deposition of each non-planar layer includes at least an element of rotation which causes an orientation between the extrusion axis and the tool to change at the same time as the material is extruded.

Forming some of the layers as non-planar layers enables the object to have improved structural properties. For instance the non-planar layers can be designed to follow lines of stress (such as hoop stress) in the object.

The extrusion axis meets the non-planar layer at a tilt angle which may remain constant or may change as the non-planar layer is deposited. Causing an orientation between the extrusion axis and the tool to change at the same time as the material is deposited enables this tilt angle to be controlled—for instance so that it does not change. An advantage of maintaining a tilt angle which remains constant as the non-planar layer is deposited is that it maintains a stable flow dynamic from the extrusion head to the non-planar layer.

Typically the relative movement during the deposition of each non-planar layer causes the orientation between the extrusion axis and the tool to change in accordance with a change in angle of the non-planar layer relative to the tool. In other words, the orientation is changed during deposition to follow the shape of the non-planar layer.

The material may be a thermoplastic material which cures by cooling, a thermosetting material which is cured by heating, or a material which is cured by some other mechanism (such as by photocuring or reacting with a chemical curing agent).

The extrudate which is extruded from the extrusion head and forms the object may be homogenous, but more typically it has a heterogenous structure. For instance the extrudate may comprise a reinforcement portion and a matrix portion which both run continuously along a length of the extrudate, wherein the reinforcement portion and the matrix portion have different material properties. The reinforcement portion and the matrix portion may for instance have a different melting point or a different crystallinity.

The tool may remain attached to the object, but more preferably the object and the tool are separated after the object has been manufactured, for instance by dissolving the tool. The tool may be dissolved by the action of a liquid dissolving agent, or by heating the tool so it melts and can be removed by a scraping tool or other mechanical method.

Typically at least some of the layers have a different size and/or a different shape in accordance with the stored three-dimensional model of the object.

The method may further comprise manufacturing the tool prior to manufacturing the object, the tool being manufactured by: extruding a tool material from an extrusion head onto a build member (such as a build plate); generating a relative movement between the extrusion head and the build member as the tool material is extruded onto the build member plate so that the tool material is deposited as a series of tool layers, wherein the tool material cures on or after deposition so that the tool layers are fused together, and controlling the extrusion of the tool material and the relative movement so that the series of tool layers are shaped in accordance with a stored three-dimensional model of the tool.

The extrusion head which manufactures the tool may be the same as the extrusion head which forms the object. Alternatively the tool and the object may be manufactured by different respective extrusion heads.

Typically each tool layer is substantially planar, in contrast with the object in which at least some of the layers are non-planar. In this case the tool and the object are preferably manufactured by different extrusion heads—the tool extrusion head being able to translate but not rotate.

The tool material may have different material properties to the material forming the object. For instance the tool material may be homogenous and the material forming the object may be heterogenous. In this case the tool and the object are preferably manufactured by different extrusion heads—it being easier to switch between different extrusion heads than to change the material being fed to a single extrusion head.

The relative rotation may be generated by rotating the extrusion head without rotating the tool, by rotating the tool without rotating the extrusion tool, or by rotating both. The relative motion of the extrusion head and the tool during deposition of the non-planar layers may be a pure orbital rotation (that is a rotation about a single point with no relative translation) but more typically it is a compound motion comprising a mixture of rotation and translation.

A further aspect of the invention provides a system for manufacturing an object by an extrusion-based additive manufacturing method, the system comprising: an extrusion head having a channel with an extrusion outlet; a build member; a feed mechanism for feeding material into the channel of the extrusion head so that the material is extruded from the extrusion outlet; a drive system arranged to cause relative translation between the extrusion head and the build member along three axes, and relative rotation between the extrusion head and the build plate about at least two axes; a memory (typically a computer memory) for storing a three-dimensional model of the object; and a controller programmed to operate the feed mechanism and the drive system in order to manufacture the object on the build plate by extrusion-based additive manufacturing in accordance with the three-dimensional model of the object stored in the memory, wherein the controller is programmed to cause the drive system to generate at least an element of relative rotation between the extrusion head and the build member at the same time that the feed mechanism causes the material to be extruded from the extrusion outlet.

Each layer of the object may be manufactured with a single extruded line or road only, for instance following a serpentine pattern. However more preferably each layer is manufactured with multiple extruded lines.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
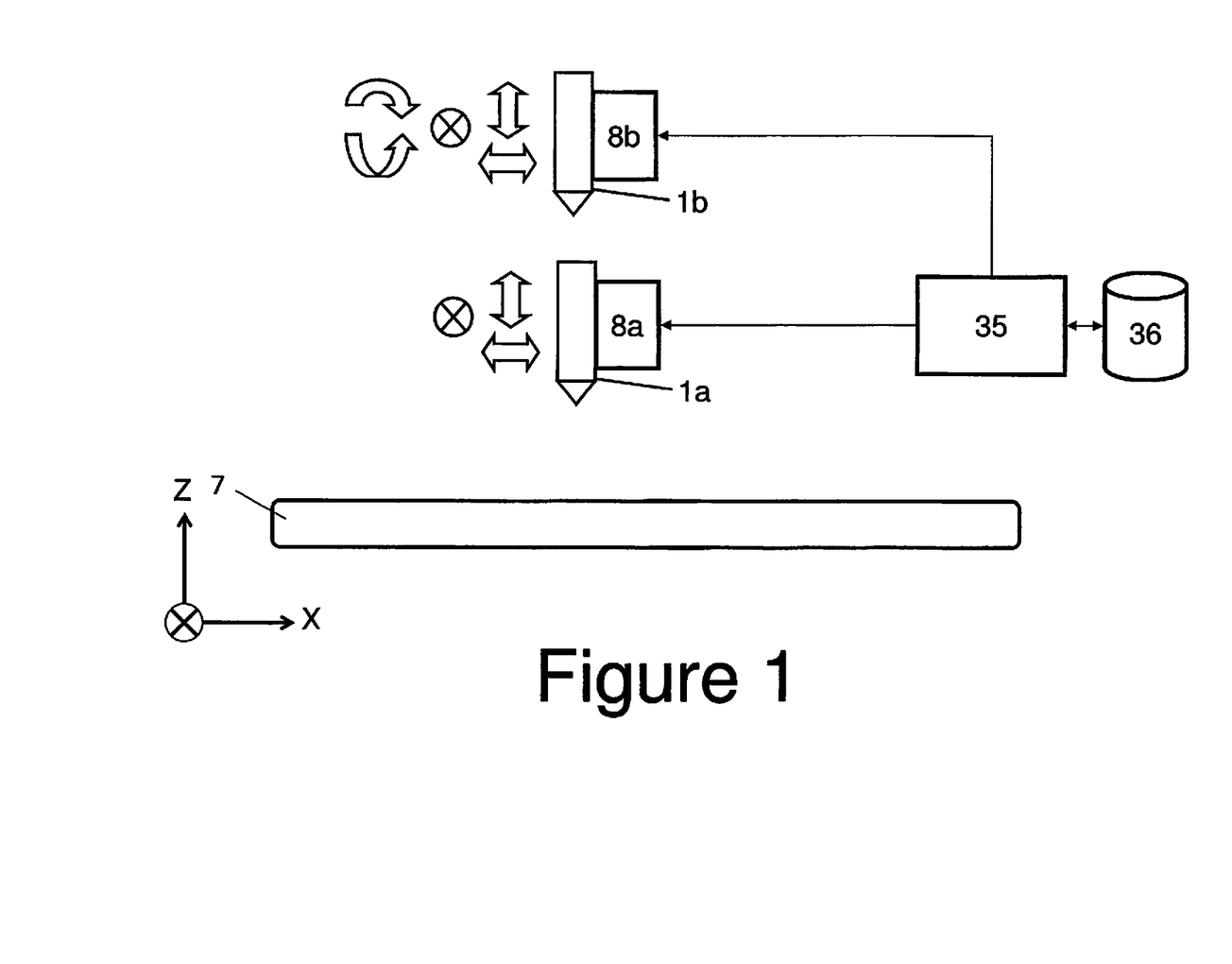
FIG. 1 is a schematic view of a system for manufacturing an object by an extrusion-based additive manufacturing method.

Apparatus for manufacturing an object by an extrusion-based additive manufacturing method is shown in FIG. 1. The apparatus comprises a tool extrusion head 1a, an object extrusion head 1b and a build plate 7 (which may be heated).

A 3-axis drive system 8a is arranged to move the tool extrusion head 1a along three axes relative to the build plate 7. The drive system 8a is capable of translating the tool extrusion head 1a back and forth in the X and Z directions (in the plane of FIG. 1) as well as in the Y direction (in and out of the plane of FIG. 1).

A 5-axis drive system 8b is arranged to move the object extrusion head 1b along and about five axes relative to the build plate 7. The drive system 8b is capable of translating the object extrusion head back and forth in the X and Z directions (in the plane of FIG. 1) as well as in the Y direction (in and out of the plane of FIG. 1). The drive system 8b is also capable of rotating the object extrusion head 1b clockwise and anti-clockwise about axes of rotation parallel to the X or Y axis, in order to change its orientation (that is, its angle of tilt) relative to the build plate 7. To facilitate manipulation in addition to X, Y and X movements the head is mounted on a two-axis gimbal to allow this rotation. A suitable 5-axis drive system is an industrial robot such as the Kuka KR240 R3200 PA (KR QUANTEC) available from Kuka Roboter GmBH. Alternatively a higher accuracy (+/−0.05 mm) robot may be used such as the Kuka KR R2900 EXTRA HA (KR QUANTEC) also available from Kuka Roboter GmBH. The latter is a 6-axis robot rather than a 5-axis robot.

In this embodiment of the invention the build plate 7 remains stationary and all movement is performed by the extrusion heads 1a,b. However it will be appreciated that in alternative embodiments some or all of the relative movement between the extrusion heads and the build plate 7 may be achieved by moving the build plate instead. For instance the build plate 7 could be translated in Z so the 5-axis drive system 8b is replaced by a 4-axis drive system and the 3-axis drive system 8a is replaced by a two-axis drive system.

Figure 2:
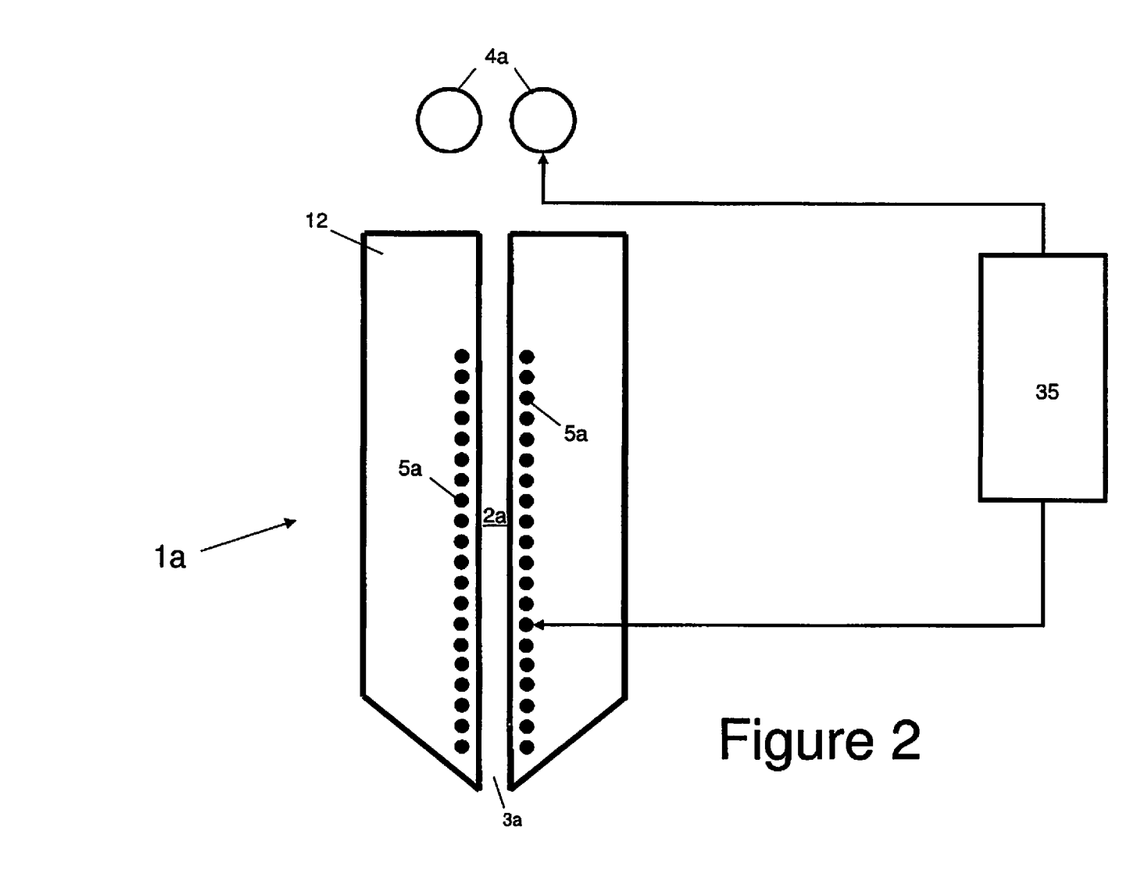
FIG. 2 is a schematic side view of the tool extrusion head.
Figure 3:
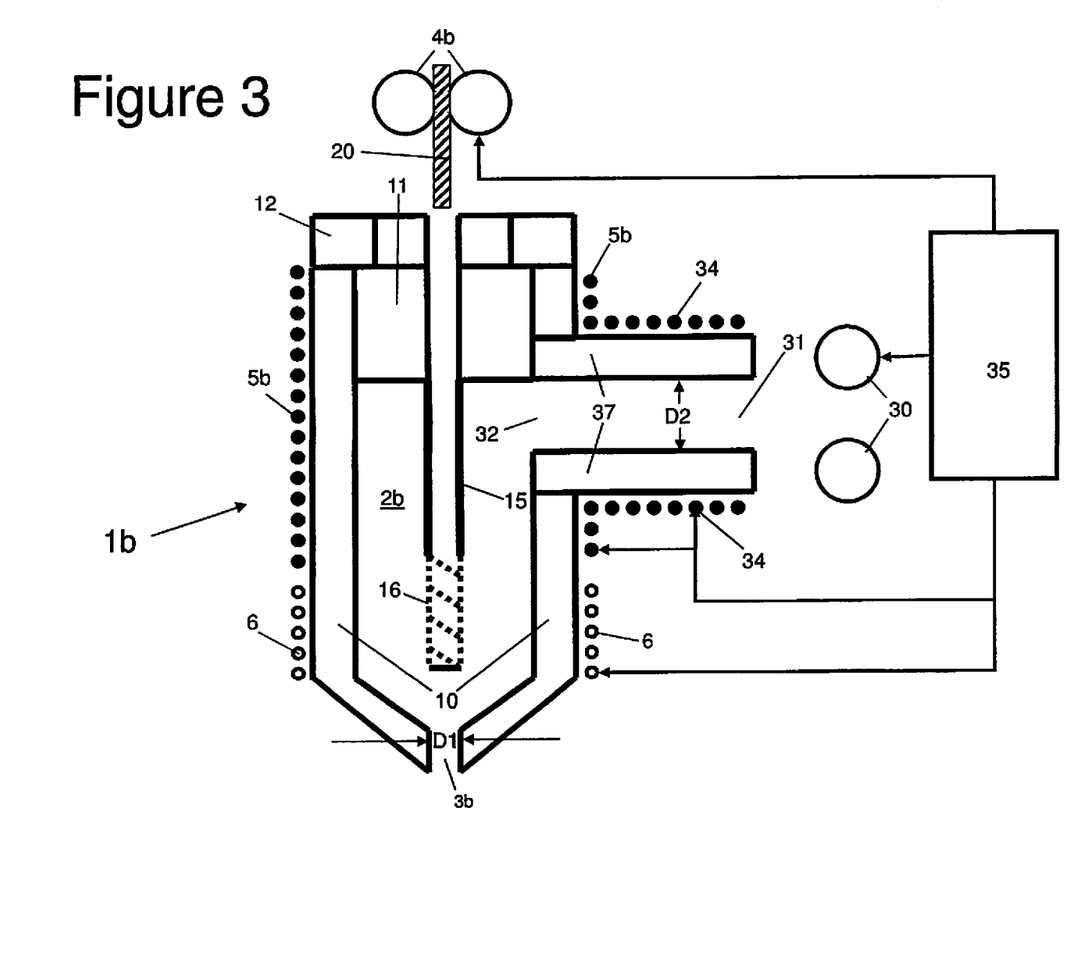
FIG. 3 is a schematic side view of the object extrusion head.

The detailed construction of the extrusion heads 1a,b is shown in FIGS. 2 and 3 respectively. Each extrusion head has a chamber 2a,b with an extrusion outlet 3a,b; a pair of motorized fibre drive rollers 4a,b; and a chamber heater 5a,b. The object extrusion head 1b also has a pair of matrix feed rollers 30, a fibre heater 6; and a matrix heater 34.

A controller 35 controls the heaters 5a, 5b, 6, 34, the motorized rollers 4a, 4b, 30 and the drive systems 8a,b in order to manufacture an object in accordance with a Computer Aided Design (CAD) model of the object in a computer memory 36 by following the process shown in FIGS. 4-14.

Figure 4:
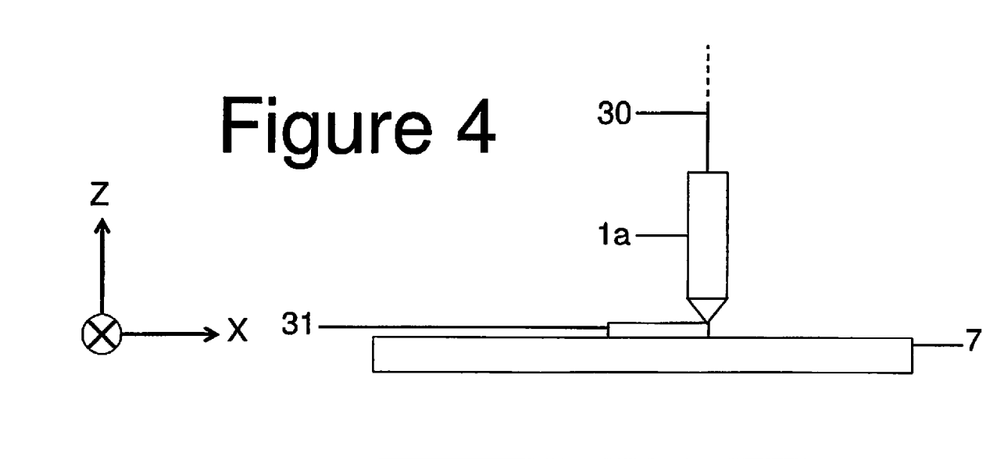
FIG. 4 is a side elevation showing a first step in manufacturing the tool.
Figure 5:
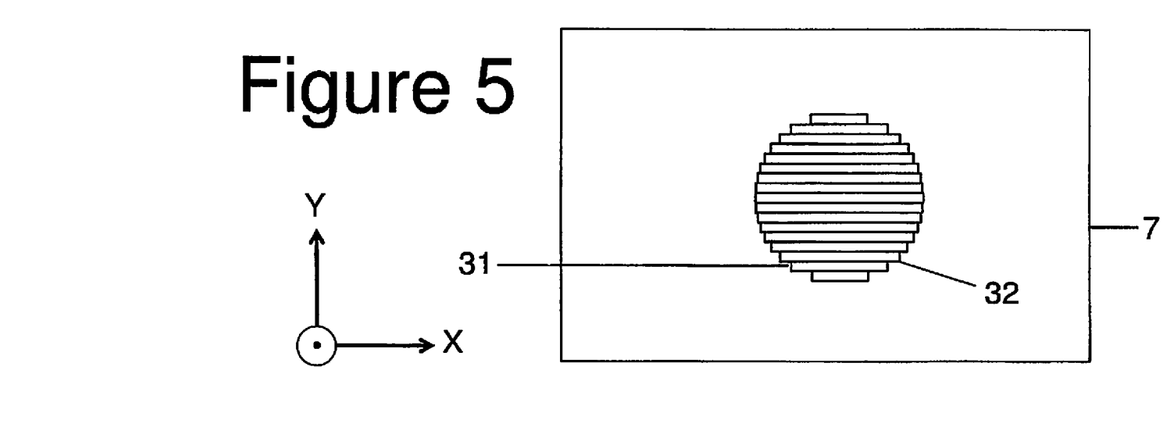
FIG. 5 is a plan view of the first layer of the tool.
Figure 6:
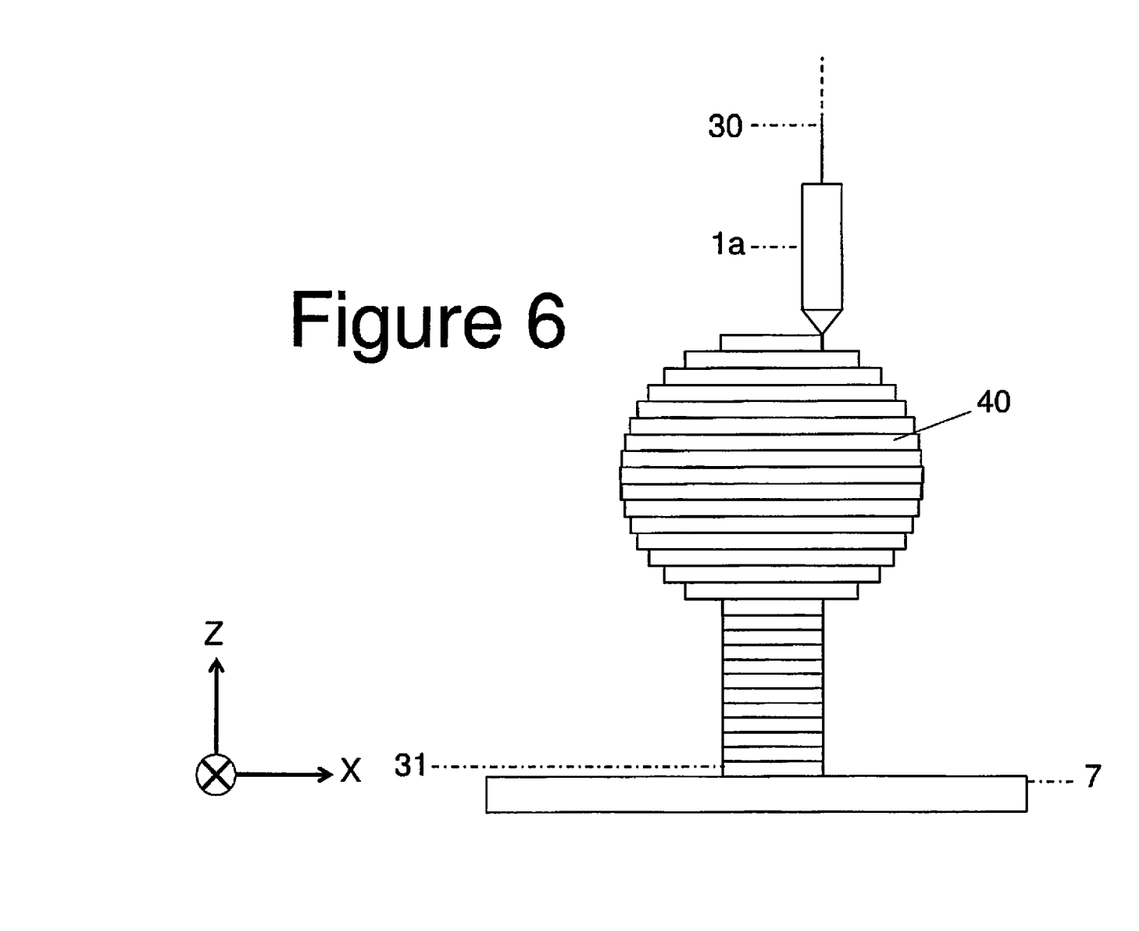
FIG. 6 is a side elevation showing the fully formed tool.
Figure 7:
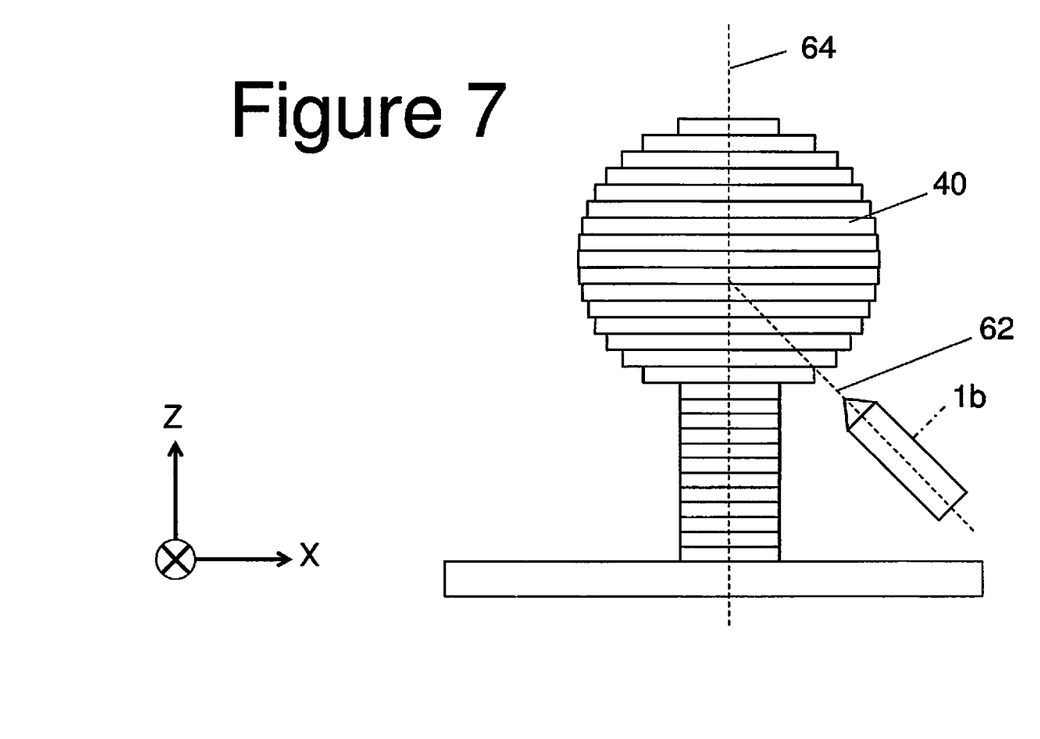
FIGS. 7 and 8 are a side elevation showing the extrusion of a first line of the object on the tool.

First, the tool extrusion head 1a is used to manufacture a tool on the build plate by the process of FIGS. 4-6. The drive wheels 4a are driven to feed a single-part filament 30 into the chamber 2a and the three-axis tool extrusion head drive system 8a moves the tool extrusion head 1a into a desired position above the build plate 7. The heater 5a is operated to raise the temperature of the filament 30 in the extrusion head above its melting point so that the filament melts within the extrusion head. The melted material is then extruded from the extrusion head onto the build plate 7 and the system 8a is operated to deposit an extruded line 31 as shown in FIG. 4. The extruded line 31 solidifies when it cools after it has been laid down on the build plate 7.

FIG. 5 is a plan view of the build plate showing the extruded line 31 from above. When the line 31 has been extruded, the filament drive wheels 4a are stopped, the extrusion head 1a is translated in X and Y to the next position, and a second extruded line 32 is laid down as shown in FIG. 5. This process is then repeated to lay down a series of extruded lines as shown in FIG. 5, each forming part of the same planar layer and each fusing with an adjacent line or lines. In the example of FIG. 5 the planar layer is formed by a series of individual extruded lines 31, 32 etc, but alternatively the layer may be formed from a single line by continuously extruding material as the head 1a traverses the build plate in a spiral or raster pattern for example.

The process of FIG. 5 is then repeated to form a stack of planar layers as shown in FIG. 6, each layer fusing with a previously deposited layer and some of the layers have a different shape and/or size in accordance with the CAD model to build up a three-dimensional mandrel or tool 40.

Next, the tool extrusion head 1*a* is moved away and the object extrusion head 1*b* is used to manufacture an object on the tool 40 by the process of FIGS. 7-12. Before these process steps are described, the construction of the object extrusion head 1*b* will be described in more detail with reference to FIG. 3. The extrusion head 1*b* has a cylindrical body 10 with an opening at its upper end and a conical part at its lower end leading to the extrusion outlet 3*b*. A plug 11 carried on a base 12 is received in the upper end of the body 10. The base 12 is attached to the upper rim of the cylindrical body 10. A fibre feed tube passes through the base 12 and the plug 11 and extends into the chamber 2*b*. The interior of the tube provides a cylindrical fibre feed channel with an inlet at its upper (proximal) end and an outlet in the chamber 2*b* at its lower (distal) end. The fibre feed tube has a continuous upper (proximal) portion 15 which passes through the plug 11 into the chamber and is a continuous cylinder with no holes, and a discontinuous lower (distal) portion 16 fully inside the chamber which has a helical lattice structure with openings distributed along its length.

The drive rollers 4*b* feed a reinforcement fibre 20 into the chamber 2 via the fibre feed channel at a velocity V1 m/s. The diameter of the reinforcement fibre 20 is typically of the order of 0.08 mm to 0.6 mm, with the drive rollers 4*b* being spaced apart as required to provide a fibre feed channel with an equivalent diameter.

The reinforcement fibre 20 is manufactured by spinning and drawing a polymer under tension to form one or more filaments with crystallites aligned with the length of the fibre. The reinforcement fibre 20 may consist of a single one of such filaments, or it may comprise a plurality of such filaments. The polymer chains and crystallites in the reinforcement fibre 20 are aligned with its length.

Suitable materials for the reinforcement fibre 20 include polyethylene (PE), High Density polyethylene (HDPE), Ultra High Density polyethylene (UHDPE), Acrylonitrile butadiene styrene (ABS), Polypropylene (PP), Polydimethyl siloxane (PDMS), Polyoxymethylene (POM), Polyethylene terephthalate (PET), Polyetheretherketone (PEEK), Polyamide (PA), Polysulphone (PS), Polyphenylene sulphide (PPS), Polyphenylsulfone (PPSF), Polytetrafluoroethylene (PTFE), or polyvinylidene fluoride (PVDF).

Dyneema® is one example of a suitable UHDPE fibre which can provide a yield strength greater than 2 GPa and preferably greater than 2.4 GPa, a crystallinity by weight which is greater than 80% and preferably greater than 85%, and has polymer chains with a parallel orientation greater than 90% or more preferably greater than 95%.

A matrix feed tube 37 is mounted to the body 10 towards the upper end of the chamber 2*b*. The interior of the matrix feed tube 37 provides a cylindrical matrix feed channel with an inlet 31 at its outer (distal) end and an outlet 32 in the side of the body 10 at its inner (proximal) end. A pair of motorized matrix feed rollers 30 are arranged to feed a matrix fibre (not shown) into the matrix feed channel. Alternatively the matrix material could be fed into the matrix feed channel in the form of a powder. The tube 37 carries a matrix heater 34 which melts the matrix fibre in the tube 37 to transform it into liquid matrix material. The liquid matrix material then flows into the chamber 2*b* through the outlet 32 at a velocity V2 m/s controlled by the rotation rate of the rollers 30.

The matrix feed tube 37 is oriented at right angles to the fibre feed tube 15,16 but may also be oriented so that the matrix is fed downwardly into the chamber at an acute angle to the reinforcement fibre if desired.

The matrix material forming the matrix fibre is typically the same polymer as the material forming the reinforcement fibre 20, optionally with different molecular weights. Where the molecular weights are different, then preferably the reinforcement fibre material has the higher molecular weight (for instance between 2,000,000 and 6,000,000 in the case of UHDPE). The reinforcement fibre 20 also has a higher crystallinity than the matrix fibre 33. This higher crystallinity results in a higher melting point.

Typically the fibres are both formed by drawing the fibre under tension from a polymer melt. However the crystallinity of the reinforcement fibre 20 is enhanced compared with the matrix fibre by using a slower cooling rate, a higher drawing rate and/or a polymer with a higher molecular weight.

First, the fibre drive rollers 4*b* are driven to feed the reinforcement fibre 20 into the chamber and through the extrusion outlet 3*b*. The inwardly tapering shape of the lower part of the chamber 2*b* assists in guiding the fibre 20 towards the extrusion outlet 3*b*. The drive system 8*b* is driven to move the extrusion head 1*b* into a desired position. The matrix heater 34 is turned on to melt the matrix fibre in the tube 37 and transform it into liquid matrix material. The matrix drive rollers 30 are then operated to feed the liquid matrix material into the chamber 2*b*.

The liquid matrix material wets the upper portion of the reinforcement fibre 20 in the fibre feed tube 16 via the lateral holes in the lattice structure, as well as contacting the lower portion of the reinforcement fibre 20 between the outlet of the fibre feed channel and the extrusion outlet 3*b*.

Figure 8:
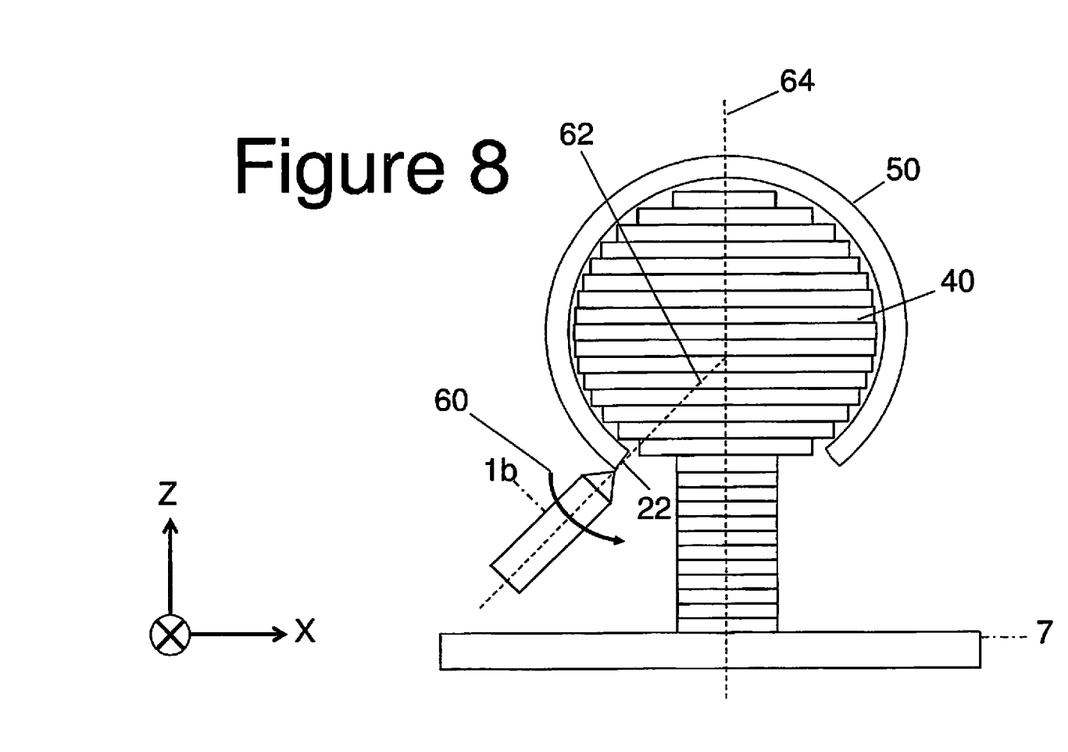

The fibre feed rollers 4*b* and matrix feed rollers 30 are then driven simultaneously to extrude a coated fibre 50 from the extrusion outlet 3*b* as shown in FIG. 8, the coated fibre 50 comprising the reinforcement fibre 20 with a coating of the liquid matrix material.

The diameters of the fibre 20 and the extrusion outlet 3*b* are selected to provide an extrudate (that is, the coated fibre 50) in which the fibre 20 occupies a volume greater than 30% of the extrudate and preferably a volume in the range of 40-60% of the extrudate.

The reinforcement fibre 20 may be relatively rigid so it can be "pushed" through the chamber by the fibre driver rollers 4*b*, moving in and out of the chamber at the same velocity V1 relative to the chamber. Alternatively the reinforcement fibre 20 may be pulled into the chamber by the viscous drag forces created by the action of the flowing liquid matrix material on the reinforcement fibre in the chamber.

The reinforcement fibre 20 does not change in cross-section as it passes through the chamber, so the extruded coated fibre 50 has a cross-sectional area transverse to its length (defined by the area of the extrusion outlet 3*b*) which is greater than that of the fibre 20 entering the chamber.

The matrix feed channel on the other hand has a diameter D2 of the order of 3 mm which is much greater than the diameter D1 of the extrusion outlet 3*b*. Consequently the cross-sectional area A2 of the matrix feed channel (and the solid matrix fibre being fed into it) is greater than the cross-sectional area A1 of the extrusion outlet (and the coated fibre 50 being extruded from it). The area A2 is also greater than the cross-sectional area of the matrix coating of the coated fibre 50. Consequently the liquid matrix material has a relatively slow velocity V2 relative to the chamber as it flows into the chamber at the inlet 32 into the chamber, but it is extruded out of the extrusion outlet 3*b* with the coated fibre 50 at a higher velocity V1.

The large diameter D2 of the matrix feed channel (and the solid matrix fibre being fed into it) means that the solid matrix fibre has sufficient buckling strength to allow it to be driven by the matrix feed rollers 30 into the matrix feed channel with sufficient force to apply a positive pressure. This positive pressure elevates the pressure of the liquid matrix material in the extrusion chamber, and can be controlled by appropriate operation of the rollers 30. The elevated pressure in the extrusion chamber provides two benefits. Firstly it assists the wetting of the reinforcement fibre 20 by the liquid matrix material. Secondly, it reduces the likelihood of defects in the coating of the extruded coated fibre 50.

As the coated fibre 50 is extruded, the drive system 8b is operated to cause relative movement between the extrusion outlet 3b and the build plate 7 and tool 40 as the coated fibre 50 is extruded from the extrusion outlet, depositing a first extruded line 50 (also known as a "road") onto the tool as shown in FIG. 8. Only the matrix coating is molten and the reinforcement fibre 20 remains in a rigid semi-crystalline state as it passes through the chamber and out of the extrusion outlet 3b. The matrix coating of the coated fibre solidifies when it cools after it has been deposited. Optionally cooling fans (not shown) may be positioned near the outlet 3b to cool the extrudate more quickly.

The pair of heaters 5b,6 are independently controllable by the controller 35. As the coated fibre is extruded, both heaters 5b,6 are operated to heat the chamber and prevent the matrix material in the chamber from solidifying. However during extrusion the temperature in the chamber is kept below the melting point of the reinforcement fibre 20 so it remains rigid.

When a break is required in the extruded line 50, then the fibre heater 6 is operated to temporarily raise the temperature of the reinforcement fibre in the lower part of the extrusion head 1b above its melting point, thereby forming a break in the continuous reinforcement fibre. At the same time the drive system 8b is operated to move the extrusion head 1b away from the tool 40 and effectively "cut" the coated fibre to form an end 22 of the extruded line 50.

Figure 9:
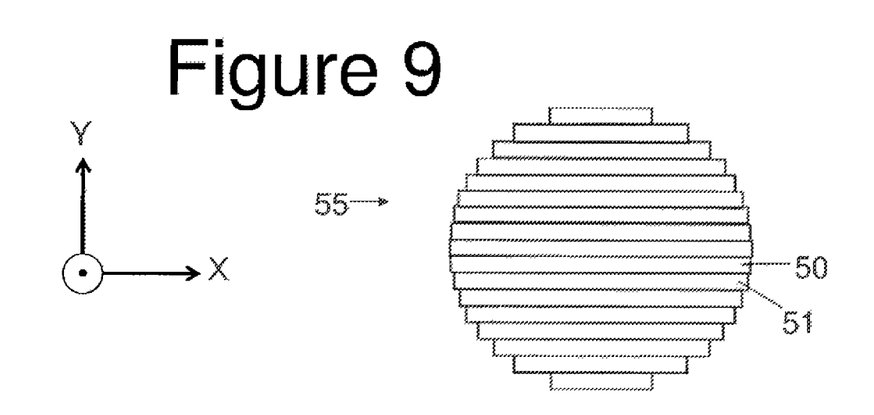
FIG. 9 is a plan view of the first layer of the object.

Next, the fibre heater 6 is turned down to lower the temperature in the lower part of the extrusion chamber back below the melting point of the reinforcement fibre 20 to enable a further line 51 to be extruded as shown in FIG. 9.

A small amount of amorphous material is extruded out of the chamber 2b between the cut lines 50 and 51. This material can deposited at the edge of the part and machined away after the whole part has been formed. The number of cuts 22 in a given part is minimised in order to minimise the quantity of such amorphous material.

The length of time of the heat pulse which "cuts" the coated fibre at the end of each line will depend on a number of factors, mainly the thermal mass of the extrusion head 1b, but it will typically be of the order of 0.1 to 10 s.

The matrix coating of the extruded coated fibre 51 fuses with the coating of the previously extruded coated fibre 50 and solidifies after it has done so. In the case of FIG. 9 the second line 51 is deposited alongside the first line 50 with which it fuses. The matrix material flows between and bonds together adjacent reinforcement fibres after they have been extruded, filling the gaps between the reinforcement fibres in adjacent extruded layers.

Next, the fibre heater 6 is operated again to temporarily raising the temperature of the fibre in the extrusion head above its melting point after the second line 51 has been extruded, thereby forming a break. At the same time the drive system 8b is operated to move the head 1b away from the tool and effectively "cut" the fibre to form an end of the extruded line 51.

Figure 10:
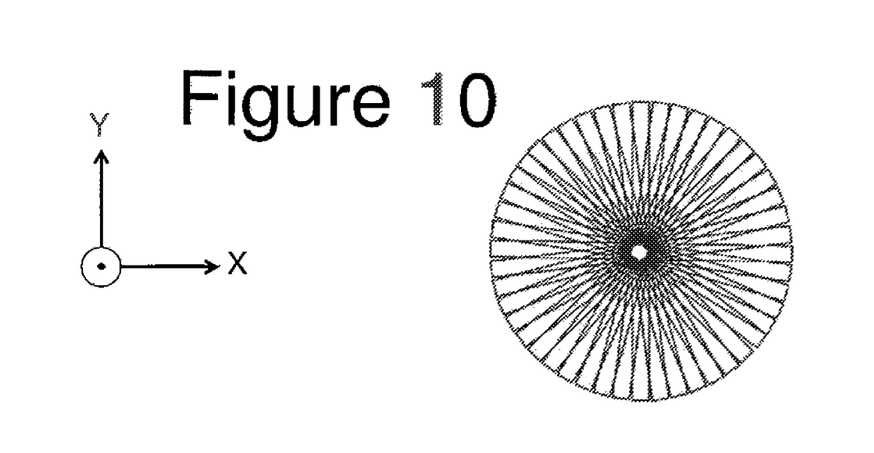
FIG. 10 is a plan view of the first layer of the object with an alternative deposition path.

This process is then repeated a number of times as required to manufacture a first layer 55 of the object in accordance with the CAD model in the memory as shown in the plan view of FIG. 9. Although each individual line 50,51 etc. in the layer 55 lies in a single plane (parallel with the XZ plane of FIG. 11) the layer 55 as a whole is non-planar—in this case the layer 55 has a domed shape. FIG. 10 shows an alternative arrangement for the first layer in which each individual line follows a radial path extending away from the centre, the lines overlapping at the centre.

Figure 11:
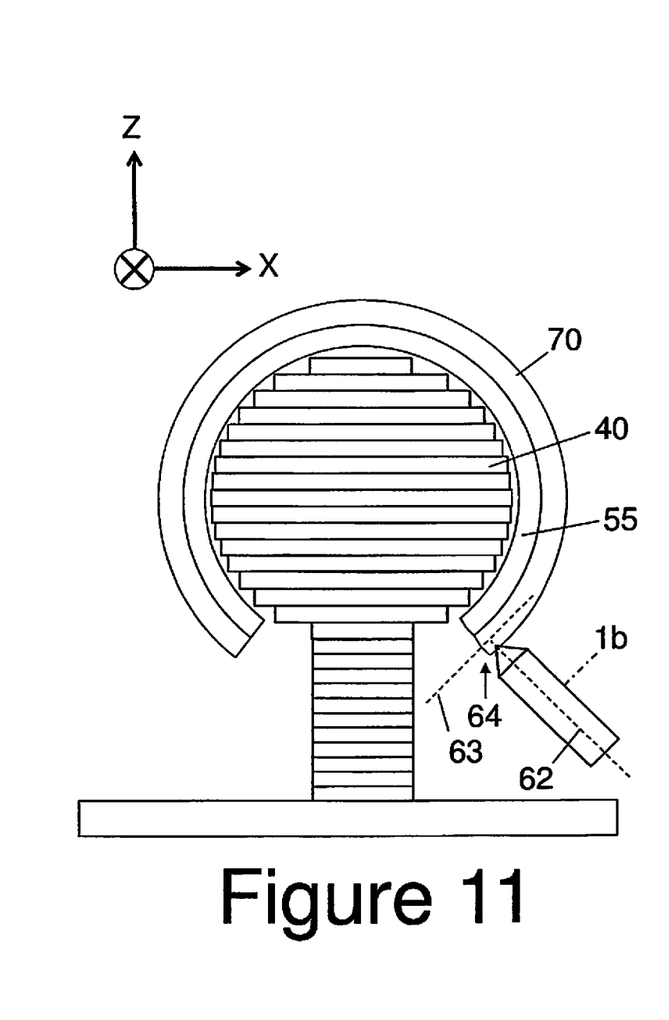
FIG. 11 is a sectional side view showing the extrusion of a second layer of the object.
Figure 12:
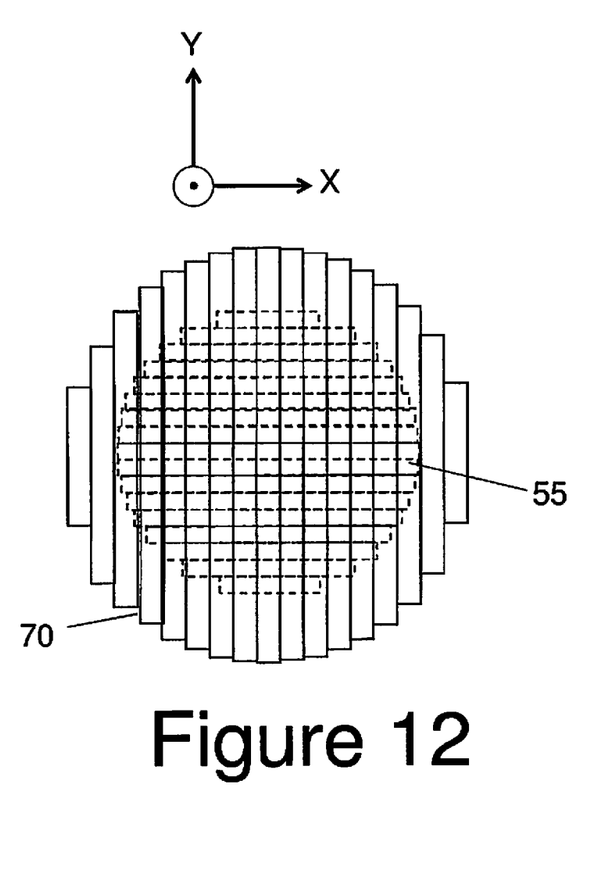
FIG. 12 is a plan view showing the second layer, and the first layer in dashed line.

The next layer 70 is then formed over the first layer 55 as shown in FIGS. 11 and 12 in accordance with the CAD model in the memory. As shown in FIG. 12 the extruded lines in the second layer 70 are formed with each line following a two-dimensional curve which lies in a plane parallel with the YZ plane (in and out of the plane of FIG. 11) rather than the XZ plane (the plane of FIG. 11). Alternatively the extruded lines in the second layer 70 may follow two-dimensional curves which lie in any other plane, or they may follow three-dimensional curves (that is, curves which do not lie in a single plane). The second layer 70 has a slightly increased size compared to the first layer 55 (this difference in size being exaggerated in FIG. 12).

Figure 14:
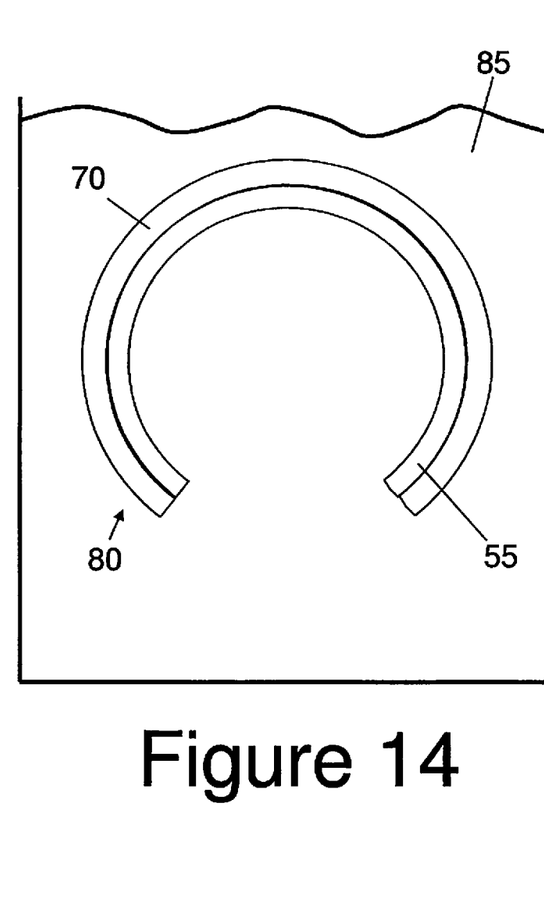
FIG. 14 shows the object in the bath after the tool has dissolved.

The process is then repeated further until the entire object has been built with a series of dome-shaped layers similar to the layers of an onion. The object may be, for example, a helmet. FIG. 14 shows the object 80 as only two layers for ease of illustration but in practice there will be a much larger number of layers.

The rotation 60 of the head 1b shown in FIG. 8 causes an orientation or tilt angle between the extrusion axis 62 and the tool 40 and build plate 7 to change at the same time as the material is deposited. Thus when the head 1b is at the start of the line 50 as in FIG. 7 it is oriented with its extrusion axis 62 at a tilt angle of about +45° relative to a nominal tool axis 64. As the line 50 is extruded this tilt angle changes continuously from about +45° in FIG. 7 to about −45° in FIG. 8. The orientation between the extrusion axis 62 and the tool axis 64 changes in accordance with a change in angle of the non-planar layer relative to the tool axis 64, thus maintaining a constant orthogonal extrusion angle between the extrusion axis 62 and the line being deposited. FIG. 11 illustrates the orthogonal extrusion angle 64 between the extrusion axis 62 and a line 63 tangent to the layer being deposited where the extrusion axis 62 meets the layer.

In the simplified example of FIG. 8 the extrusion head follows a pure orbital rotation about a single point in the tool to form a line 50 with constant curvature, but if a more complex shape is required then the motion of the head 1b will also include an element of translation in X, Y and/or Z so the curvature of the line varies across the layer.

This change of orientation of the head 1b relative to the tool axis 64 during extrusion provides a number of advantages:
  it enables a single line 50 to be deposited not only on the upper side of the tool 40 but also on its underside
  it enables each line 50 of each layer to follow lines of stress in the object, such as circumferential hoop stress. Since the extrudate is stiffer and stronger along its length this provides greater resistance to circumferential hoop stress than if the domed shape of the object was built up in a conventional manner by forming a stack of planar layers (like the tool 40)

the constant extrusion angle 64 between the extrusion axis 62 and the line being deposited provides the advantage that it maintains a stable flow dynamic from the extrusion head to the line being deposited. A 90° extrusion angle 64 is shown in FIG. 11, and this may be preferred since it enables the angle of the extrusion head to remain constant when a planar layer is being deposited. In an alternative embodiment the extrusion angle 64 between the extrusion axis 62 and the line being deposited may be an oblique angle. In this case the extrusion axis may be tilted forward in the direction of motion of the extrusion head so that there is a constant acute angle between the extrusion axis and a direction of the relative movement between the extrusion head and the tool (and equivalently a constant obtuse angle between the extrusion axis and the extruded line).

Figure 13:
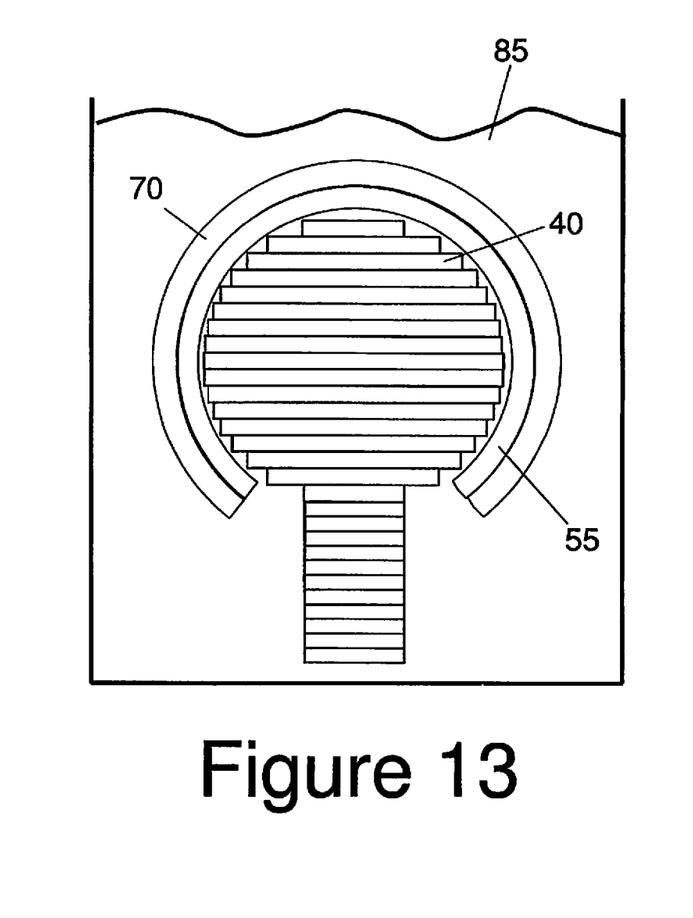
FIG. 13 shows the object and tool immersed in a solvent bath.

After the object has been fully formed, the tool 40 carrying the object 80 is immersed in a bath of solvent 85 as shown in FIG. 13. The tool 40 dissolves away, leaving only the object 80 as shown in FIG. 14 which can then be removed from the bath. A suitable material for the tool is Stratasys SR20/SR30 available from Stratasys Ltd, and a suitable solvent is "WaterWorks" solution also available from Stratasys Ltd. Alternatively the tool 40 may be left intact in the final product.

Although the invention has been described above with reference to one or more preferred embodiments, it will be appreciated that various changes or modifications may be made without departing from the scope of the invention as defined in the appended claims.

The invention claimed is:

1. A method of manufacturing an object, the method comprising:
    extruding material from an extrusion head onto a non-planar surface of a three-dimensional tool, the extrusion head having an extrusion axis along which the material flows as it exits the extrusion head;
    moving the extrusion head relative the tool as the material is extruded so that the material is deposited as a series of layers, wherein the material cures on or after deposition so that the layers are fused together, and
    controlling the extrusion of the material and the relative movement so that the series of layers are shaped in accordance with a stored three-dimensional model of the object,
    wherein at least some of the layers are non-planar layers, and the relative movement during the deposition of each non-planar layer includes at least an element of rotation which causes an orientation between the extrusion axis and the tool to change at the same time as the material is deposited,
    wherein at least a first layer of the object is a non-planar layer that conforms to the shape of the three-dimensional tool, and
    wherein at least a portion of the at least first layer of the object extends to an underside of the tool.

2. The method of claim 1 wherein the material is extruded from the extrusion head as an extrudate, and the extrudate comprises a reinforcement portion and a matrix portion which both run continuously along a length of the extrudate, wherein the reinforcement portion and the matrix portion have different material properties.

3. The method of claim 2 wherein the reinforcement portion and the matrix portion have a different melting point or a different crystallinity.

4. The method of claim 1 wherein the relative movement during the deposition of each non-planar layer causes the orientation between the extrusion axis and the tool to change in accordance with a change in angle of the non-planar layer relative to the tool.

5. The method of claim 4 wherein the relative movement causes the orientation between the extrusion axis and the tool to change so that a tilt angle of the extrusion axis relative to the non-planar layer where the extrusion axis meets the non-planar layer does not change.

6. The method of claim 1 further comprising separating the object and the tool after the object has been manufactured.

7. The method of claim 6 further comprising further comprising separating the object and the tool after the object has been manufactured by dissolving the tool.

8. The method of claim 1 wherein at least some of the layers have a different size or shape.

9. The method of claim 1 wherein the relative rotation is generated by rotating the extrusion head without rotating the tool.

10. The method of claim 1 wherein each layer is manufactured with multiple extruded lines.

11. A method of manufacturing an object, the method comprising:
    extruding material from an object extrusion head onto a tool, the object extrusion head having an extrusion axis along which the material flows as it exits the object extrusion head;
    generating a relative movement between the object extrusion head and the tool as the material is extruded so that the material is deposited as a series of layers, wherein the material cures on or after deposition so that the layers are fused together, and
    controlling the extrusion of the material and the relative movement so that the series of layers are shaped in accordance with a stored three-dimensional model of the object,
    wherein at least some of the layers are non-planar layers, and the relative movement during the deposition of each non-planar layer includes at least an element of rotation which causes an orientation between the extrusion axis of the object extrusion head and the tool to change at the same time as the material is deposited,
    manufacturing the tool prior to manufacturing the object, the tool being manufactured by:
    extruding a tool material from a tool extrusion head onto a build member;
    generating a relative movement between the tool extrusion head and the build member as the tool material is extruded onto the build member so that the tool material is deposited as a series of tool layers, wherein the tool material cures on or after deposition so that the tool layers are fused together, and
    controlling the extrusion of the tool material and the relative movement so that the series of tool layers are shaped in accordance with a stored three-dimensional model of the tool.

12. The method of claim 11 wherein each tool layer is substantially planar.

13. The method of claim 11 wherein the tool material has different material properties to the material forming the object.

14. A system for manufacturing an object by an extrusion-based additive manufacturing method using a tool, the system comprising:
    an object extrusion head having a channel with an extrusion outlet;
    a build member;

a feed mechanism for feeding material into the channel of the extrusion head so that the material is extruded from the extrusion outlet;

a drive system arranged to cause relative translation between the extrusion head and the build plate along three axes, and relative rotation between the extrusion head and the build plate about at least two axes;

a memory for storing a three-dimensional model of the object; and a controller configured to operate the feed mechanism and the drive system in order to manufacture the object on the build plate by extrusion-based additive manufacturing in accordance with the three-dimensional model of the object stored in the memory, wherein the controller is programmed to cause the drive system to generate at least an element of relative rotation between the object extrusion head and the build member at the same time that the feed mechanism causes the material to be extruded from the extrusion outlet;

a tool extrusion head having a channel with a tool extrusion outlet;

a tool feed mechanism for feeding tool material into the channel of the tool extrusion head so that the tool material is extruded from the tool extrusion outlet;

a tool extrusion head drive system arranged to cause relative translation between the tool extrusion head and the build plate along three axes; and the controller further configured to operate the tool feed mechanism and the tool extrusion head drive system in order to manufacture the tool on the build member by extrusion-based additive manufacturing in accordance with a stored three-dimensional model of the tool.

* * * * *